Oct. 23, 1951   J. ANDERSON ET AL   2,572,687
POWER-ACTUATED VEHICLE-MOVING APPARATUS
Filed June 13, 1947   2 SHEETS—SHEET 1
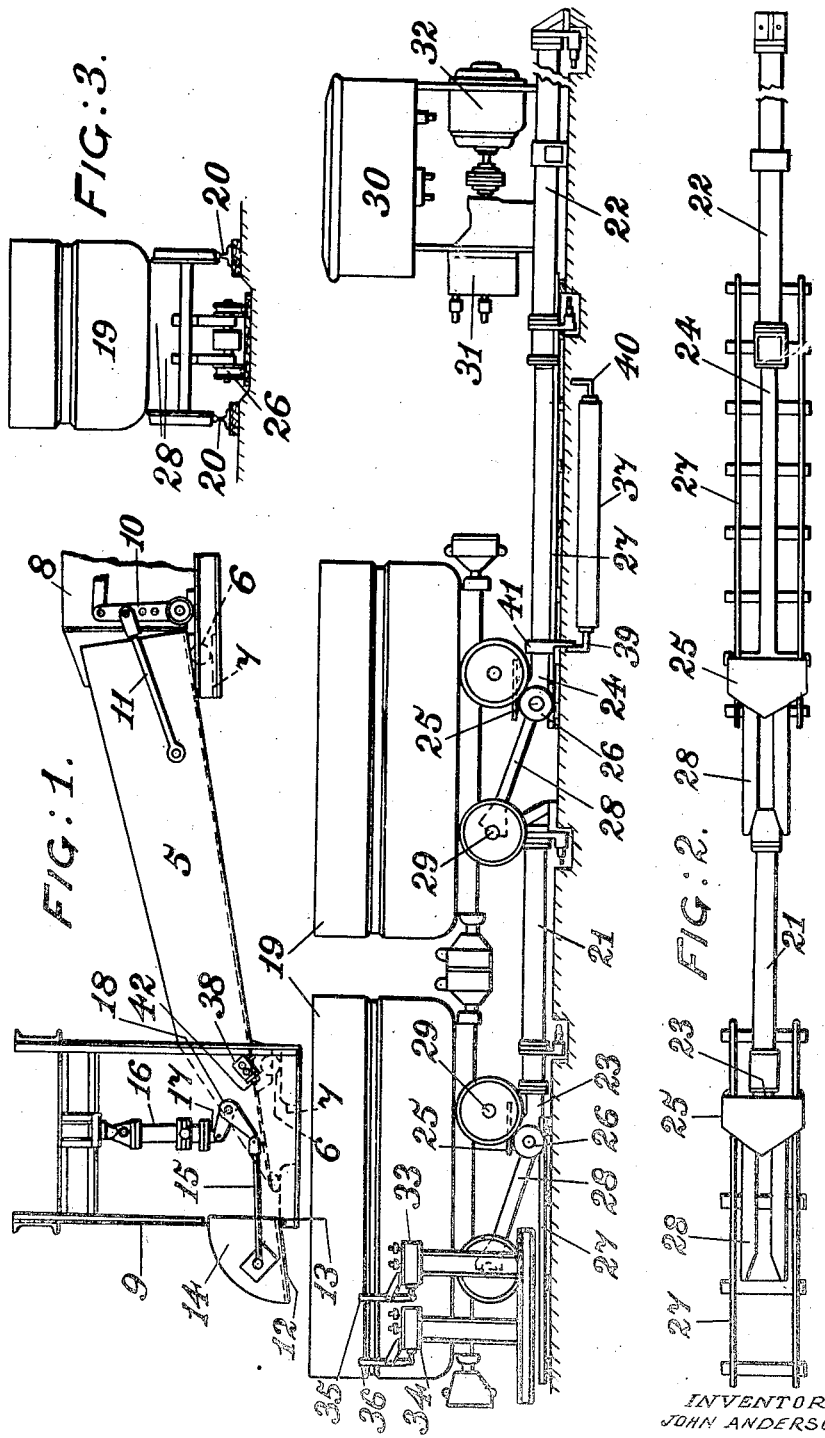
INVENTORS
JOHN ANDERSON
ANDREW FRASER
BY Otto Munk
THEIR ATTY

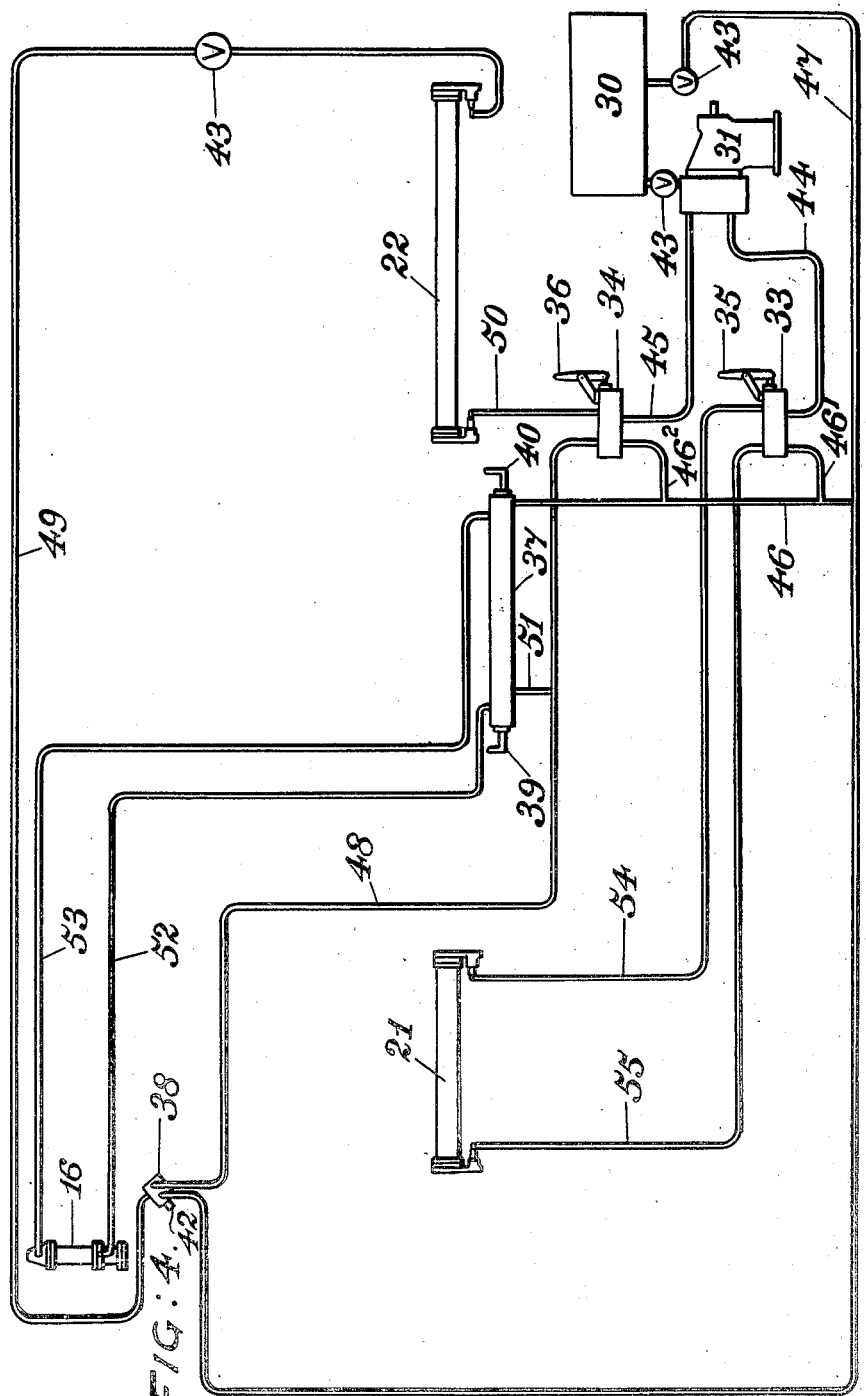

Patented Oct. 23, 1951

2,572,687

UNITED STATES PATENT OFFICE 2,572,687

POWER-ACTUATED VEHICLE-MOVING APPARATUS

John Anderson, Glasgow, Scotland, and Andrew Fraser, London, England, assignors to Mavor & Coulson, Limited, Glasgow, Scotland Application June 13, 1947, Serial No. 754,390
In Great Britain January 24, 1945

4 Claims. (Cl. 214—42)

1

This invention is concerned with circumstances in which a train of empty vehicles has to be moved under a loading chute or equivalent which is discharging coal or other loose material, so that the vehicles are filled in succession. The invention is particularly concerned with the loading of colliery tubs with coal from a conveyor by way of a chute. The use of modern high capacity conveyors in collieries necessitates power operated apparatus for shifting the tubs. Thus, a high capacity conveyor may deliver coal at the rate of seven tons per minute which necessitates the filling and removal of fourteen half-ton tubs in that time.

An object of this invention is to provide in combination with a material-discharging means, apparatus comprising two pressure-fluid ram units for engaging the vehicles to be moved, and control means for controlling the operations of the respective units, one of said units being arranged in relation to said material-discharging means to advance a vehicle to a loading station in which to receive material discharged by said means and the other of said units being arranged in relation to the first unit to move the vehicle in said station for trimming the load.

Another object is to provide apparatus comprising a high-speed pressure-fluid ram unit adapted to advance a vehicle to a loading station, in combination with a slow-speed pressure-fluid ram unit adapted to impart trimming movement to the vehicle in said station.

Another object is to arrange the two ram units in alignment at ground level, for pushing the vehicles the unit for the trimming movement being located in front of the unit for the advancing movement.

The invention will now be described by way of example with reference to the accompanying drawings, in which:

Figure 1 is an elevation of a coal delivering installation including a shaking chute system in combination with tub-moving apparatus. Fig. 2 is a plan of components of the tub-moving apparatus. Fig. 3 is an end elevation showing components of the tub-moving apparatus applied to a tub, which is shown in simple outline. Fig. 4 is a diagram of a hydraulic control system incorporated in the installation.

Referring to the drawings, the shaking chute system includes a shaking chute 5 supported at opposite ends by rollers 6 which ride upon rails 7 on stationary structures 8 and 9. The structure 8 is incorporated in the framework at the delivery end of a coal conveyor. A power-oscillated arm 10 journalled on the structure 8 is connected by a link 11 to the chute 5. The structure 9 is the stationary delivery end section of the shaking chute system. A door 12 is hinged at its lower edge, at 13, to the section 9. The door has side checks 14, each of which is connected by a link 15 to power-actuated mechanism for opening and closing the door. The mechanism includes a quick-acting hydraulic unit 16 on the section 9, the ram 17 of the unit being connected to a bell-crank lever 18 connected in its turn to the link 15.

In operation of the chute system, the chute 5 receives a reciprocatory shaking motion from the mechanism 10, 11 and delivers coal to the stationary section 9, which provides in conjunction with the hinged door 12 a hopper of sufficient capacity to contain the coal that is prevented from being discharged by the door while closed. The door is opened and closed at appropriate intervals (as hereinafter described) by the mechanism 15 to 18, the coal being discharged while the door is open.

The chute system is arranged to deliver the discharged coal at a loading station, or filling position, to a train of interconnected tubs in succession; twenty-one tubs is a customary number in a train. In Figs. 1 and 3, tubs 19 are shown in simple outline, the tubs running on a line of rails 20 (Fig. 3). These rails extend under the chute section 9. The train is brought to the loading station and thereafter the tubs are moved in succession below the door 12 by means of hydraulic apparatus, the function of which is to push a tub into appropriate positional relation with the door, which is closed for the time being; then, when the door is opened, to push the tub slowly forward, thus distributing or trimming the coal in the tub; next, the door being again closed, to push the next tub into appropriate positional relation with the door, thus forcing the first-mentioned truck beyond the door; and so on.

The hydraulic apparatus includes two double-acting hydraulic ram units 21 and 22, both fixed longitudinally at ground level between the rails 20. The rams 23 and 24 of the respective units each have a head plate 25 with wheels 26 which run on rails 27, and they each have a pair of pivotal arms 28 forming a one-way catch bar for engagement with the tub axles 29. Each catch bar 28 is urged upwards (say by spring or weight means, not shown) to a raised position in which the catch bar can grip and push an axle, as shown in Figs. 1 and 3. Each catch bar is yieldable downwards, so that an axle can pass over it without obstruction when the tub is being pushed forwards.

In the example, the unit 21 is slow-acting, being placed more or less below the section 9. The unit 22 is designed to act at a higher speed and its stroke is much longer than that of the unit 21, behind which the unit 22 is located in alignment.

The unit 16 of the door 12 and the units 21 and 22 of the tub-pushing apparatus are incorporated in the same hydraulic system, as Fig. 4 shows. The hydraulic system also includes an oil reservoir 30, an oil pump 31 driven by an electric motor 32 (Fig. 1), control means consisting of two distributing valves 33 and 34, having control handles 35 and 36 respectively for their operation, and interlock valves 37 and 38 which control the working relation between the door unit 16 and the tub-pushing apparatus. Each of the control handles 35 and 36 has three available positions, referred to herein as the "first," "second" and "third" positions.

In Fig. 4 the components of the hydraulic system are shown connected by appropriate piping. In this diagram, the components are shown without regard to their true positional relationship for simplicity and clearness of illustration; the approximate positional relationship of the components can be gathered from Fig. 1, from which the piping is omitted. The valve 37 has tappets 39 and 40 at opposite ends of its valve rod, which is actuated by a striker 41 arranged on the ram 24 of the unit 22 in order to co-operate with the tappets 39 and 40. The valve 38 has a tappet 42 on its valve rod, the bellcrank lever 18 serving as striker to the tappet 42. Stop valves 43 are connected at appropriate points in the piping of the hydraulic system.

The pump 31 draws oil from the reservoir 30 and discharges the oil under pressure to the distributing valves 33 and 34 through pipes 44 and 45. In the first (or neutral) position of the control handles 35 and 36, the oil returns through pipes 46¹ and 46² to return pipes 46 and 47 leading back to the reservoir 30, thus circulating idly.

Assume that the door 12 is closed and that an empty tub 19, one of a train of interconnected tubs, has to be advanced for filling with coal. The door ram 17 is fully advanced and the tappet 42 depressed by the lever 18. The tub-advancing ram 24 is fully withdrawn, with its catch bar 28 engaging an axle 29 of the tub next behind the tub to be filled. The coal-trimming ram 23 also is withdrawn, its catch bar 28 being inactive.

In operation of the hydraulic system, a worker moves the control handle 36 into its second position. Thus, the oil passing through the valve 34 is cut off from the return pipes 46², 46 and 47 and is supplied by way of a pipe 48, the valve 38 and a pipe 49 to the working end of the unit 22, so that the ram 24 is quickly advanced from its cylinder. In this way, the tub engaged by the unit 22 and the tub or tubs ahead of it are advanced, and the arrangement is such that the first empty tub comes below the door at the forward limit of the stroke of the ram 24. Oil passes from the return end of the unit 22 through a pipe 50 and the valve 34 to the return pipes 46², 46 and 47. It is essential to this train-advancing movement that the door 12 must be fully closed (in order to maintain the valve 38 properly positioned). Thus, as this movement involves passage of an inter-tub space of the train through the loading station, coal cannot be discharged between the tubs and loss of coal is prevented.

At about the end of this train-advancing movement, the striker 41 engages the tappet 39 and actuates the valve 37, so that oil is supplied from the pipe 48, a pipe 51, the valve 37 and a pipe 52 to the door-opening end of the unit 16. Thus the ram 17 is quickly withdrawn into its cylinder and opens the door 12, oil returning from the other end of the unit 16 by a pipe 53 and the valve 37 to the return pipe 46. At the start of the door-opening movement, the lever 18 releases the previously depressed tappet 42, so that the working end of the unit 22 is cut-off from the oil supply pipe 48. The timing of the operations is such that the door 12 is fully opened by the quick action of the unit 16 at about the instant when the tub-advancing unit 22 completes its working stroke. At this instant the front axle of the first empty tub moves over the catch bar 28 of the unit 21, and the catch bar engages it.

The apparatus is now ready for the trimming operation. Therefore the worker moves the control handle 35 into its second position, so that oil is supplied from the pipe 44 through the valve 33 and a pipe 54 to the working end of the unit 21, the ram 23 of which slowly advances the engaged tub as it fills with coal. Meantime, oil returns from the other end of the unit 21 through a pipe 55, the valve 33 and the pipe 46¹ to the return pipes 46, 47. Moreover, the worker moves the control handle 36 into its third position, in which the return end of the tub-advancing unit 22 is connected through the pipe 50 and the valve 34 to the oil supply pipe 45, so that the ram 24 is retracted into its cylinder, oil from the other end of the unit 22 passing through the pipe 49 and the valve 42 to the return pipe 47. In addition, the action of moving the handle 36 into its third position cuts-off the pipe 48, valves 37 and 38 and unit 16 from the supply pipe 45. At about the end of the return of the ram 24, the striker 41 engages the tappet 40 and returns the valve 37 to its initial position, in which the connections through the valve 37 are reversed, namely, the temporarily cut-off pipe 48 is connected through the pipe 51, valve 37 and pipe 53 to the door-closing end of the unit 16, and the other end thereof is connected through the pipe 52 and valve 37 to the return pipe 46. Thus, the connections to the unit 16 are re-set in readiness to close the door 12 on the return later of the control handle into its second position. When the tub being filled is about full, the worker moves the control handle 35 to its third position, in which oil is supplied from the pipe 44 through the valve 33 and pipe 55 to the return end of the unit 21, oil passing from the opposite end thereof through the pipe 54, valve 33 and pipe 46¹ to the return pipes 46 and 47. Finally, the worker returns the control handle 36 through its first position to its second position, thus supplying oil from the pipe 45 through the valve 34, pipe 48, pipe 51, valve 37 and pipe 53 to the door-closing end of the unit 16. Thus the door 12 is closed when the leading tub is fully advanced to the end of its trimming movement. As the door closes, the lever 18 strikes the tappet 42 and returns the valve 38 to the position in which oil is supplied to the working end of the unit 22, which therefore engages another tub of the train and pushes that tub and those in front of it sufficiently to remove the last filled tub from the loading station and to bring the now first empty tub thereinto. Thus, the cycle of operations is ended and another cycle is started. As will be understood, the now first empty truck is next engaged by the unit 21 and the necessary trimming operation is performed as the tub is loaded. The cycle of operations is repeated for each successive tub of the train.

In another patent application of even date by David Jackson and James Thomson of which Mavor & Coulson, Limited, are assignees, the invention claimed concerns a chute with a door for discharging material conveyed to the chute and power means for opening and closing the door in co-relation with apparatus for moving vehicles in succession into and out of a position in which the material is discharged through the open door into each vehicle.

We claim:

1. In combination with a material-discharging means, vehicle-moving apparatus comprising a pressure-fluid system, two pressure-fluid ram units incorporated in said system, each unit having means for engaging a vehicle to be moved, control valve means also incorporated in said system for controlling the movements of the respective units, the first of said units being arranged in relation to said material-discharging means so that it can advance a vehicle into a loading station in which to receive material discharged by said means and the other of said units being arranged in relation to the first unit so that it can impart a trimming movement to said vehicle while in said station, and a valve also incorporated in said system for controlling the operation of said material-discharging means, said valve being actuated by one of said ram units so that said material-discharging means is operative only during the trimming movement of the vehicle.

2. In combination with a material-discharging means, vehicle-moving apparatus comprising a pressure-fluid system, two pressure-fluid units incorporated in said system, the first of said units having a high-speed ram and the other having a slower-speed ram and each of said rams having means for engaging a vehicle to be moved, control valve means also incorporated in said system for controlling the movements of the respective rams, the first of said units being arranged in relation to said material-discharging means so that its high-speed ram can advance a vehicle into a loading station in which to receive material discharged by said means and the other being arranged in relation to the first unit so that its slower-speed ram can impart a trimming movement to said vehicle while in said station, and a valve also incorporated in said system for controlling the operation of said material-discharging means by one of said rams so that said material-discharging means is operative only during the trimming movement of the vehicle.

3. In combination with a material-discharging means, vehicle-moving apparatus comprising a pressure-fluid system, two pressure-fluid units incorporated in said system, the first of said units having a long-stroke ram and the other having a shorter-stroke ram and each of said rams having means for engaging a vehicle to be moved, control valve means also incorporated in said system for controlling the movements of the respective rams, the first of said units being arranged in relation to said material-discharging means so that its long-stroke ram can advance a vehicle into a loading station in which to receive material discharged by said means and the other being arranged in relation to the first unit so that its shorter-stroke ram can impart a trimming movement to said vehicle while in said station, a valve also incorporated in said system for controlling the operation of said material-discharging means, and a striker which is actuated by one of said rams and operates said valve to effect operation of said material-discharging means in timed relation with the movements imparted by the rams to the vehicle.

4. In combination with a material-discharging means, apparatus for moving wheeled vehicles with axles, such apparatus comprising a pressure-fluid system, two pressure-fluid units incorporated in said system, each unit comprising a ram and a cylinder located at about ground level in selected relationship to each other and to said material-discharging means, pivotal arms on the respective rams inclined upwards for one-way engagement with the axles of vehicles to be moved, control valve means also incorporated in said system for controlling the movements of the respective rams, one of said cylinders being arranged in front of and in alignment with the other so that the ram of the front cylinder can push forward for trimming material being discharged by said means into a vehicle already pushed into a loading station by the ram of the other cylinder, and a valve also incorporated in said system for controlling the operation of said material-discharging means by one of said rams so that said material-discharging means is operative only during the trimming movement of the vehicle.

JOHN ANDERSON.
ANDREW FRASER.

REFERENCES CITED

The following references are of record in the file of this patent:

UNITED STATES PATENTS

| Number | Name | Date |
|---|---|---|
| 1,407,253 | Castleman | Feb. 21, 1922 |
| 2,288,763 | Winship et al. | July 7, 1942 |

FOREIGN PATENTS

| Number | Country | Date |
|---|---|---|
| 583,918 | Germany | Sept. 12, 1933 |
| 293 | Italy | Sept. 30, 1856 |
| 381,939 | Great Britain | Oct. 4, 1932 |